Nov. 25, 1924.

J. C. MATTICE

PLOW

Filed Jan. 7, 1922

Inventor
John C. Mattice
By Vernon E. Hodge
Attorney

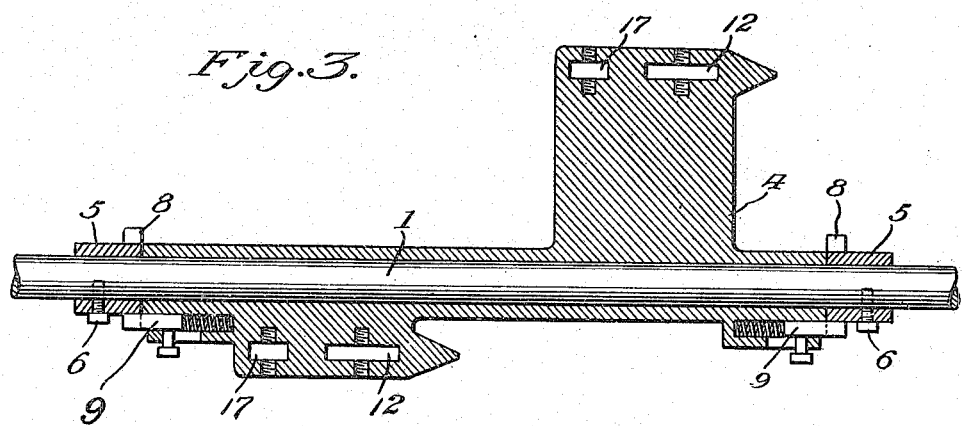
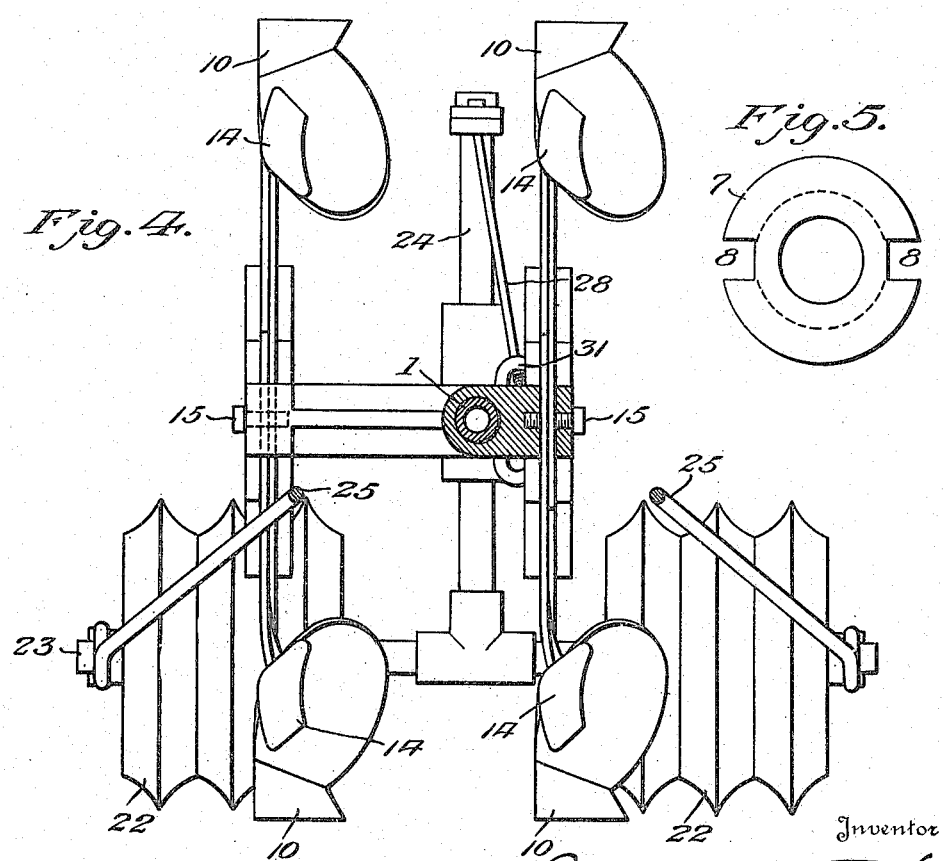
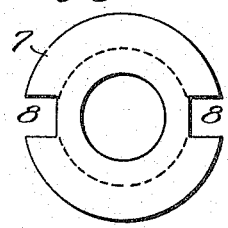

Patented Nov. 25, 1924.

1,517,086

UNITED STATES PATENT OFFICE.

JOHN C. MATTICE, OF NAPLES, NEW YORK, ASSIGNOR TO HENRY J. NEUFANG, OF ATLANTA, NEW YORK.

PLOW.

Application filed January 7, 1922. Serial No. 527,632.

*To all whom it may concern:*

Be it known that I, JOHN C. MATTICE, a citizen of the United States, residing at Naples, in the county of Ontario and State of New York, have invented certain new and useful Improvements in Plows, of which the following is a specification.

My invention relates to an improvement in plows, of the reversible type.

My object is to provide a combination machine which will plow, cut and pack the soil in one operation.

Another object is to provide a plow which will throw the furrow in the same direction, regardless of the direction of the plow.

Another object is to provide a plow which can be drawn by team or tractor, and which is capable of using either one or more plows.

In the accompanying drawings:

Fig. 3 is an enlarged horizontal section;

Fig. 4 is an enlarged section on the line 4—4 of Fig. 2, looking in the direction of the arrow; and Fig. 5 is a detail view of the means for locking the casting.

Figure 1:
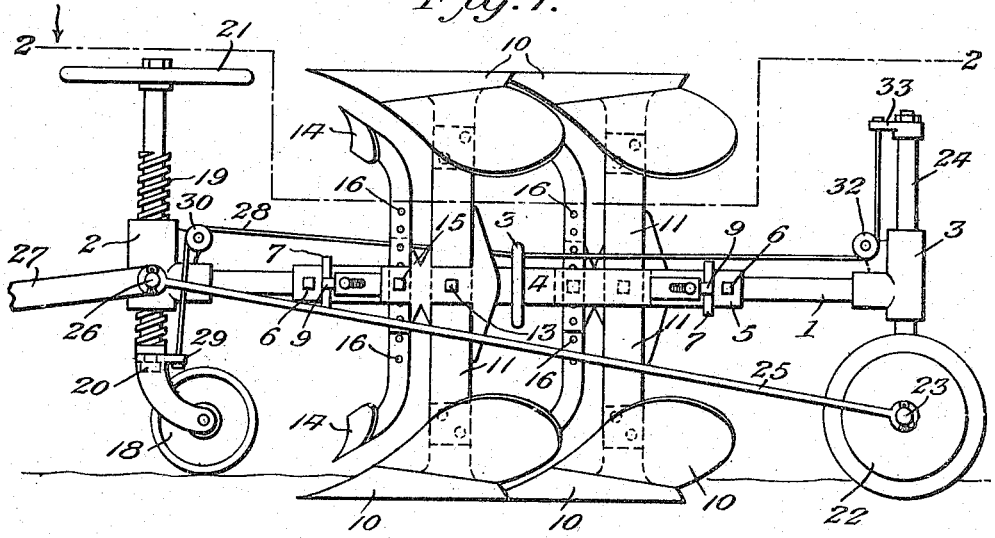
Fig. 1 is a side view.
Figure 2:
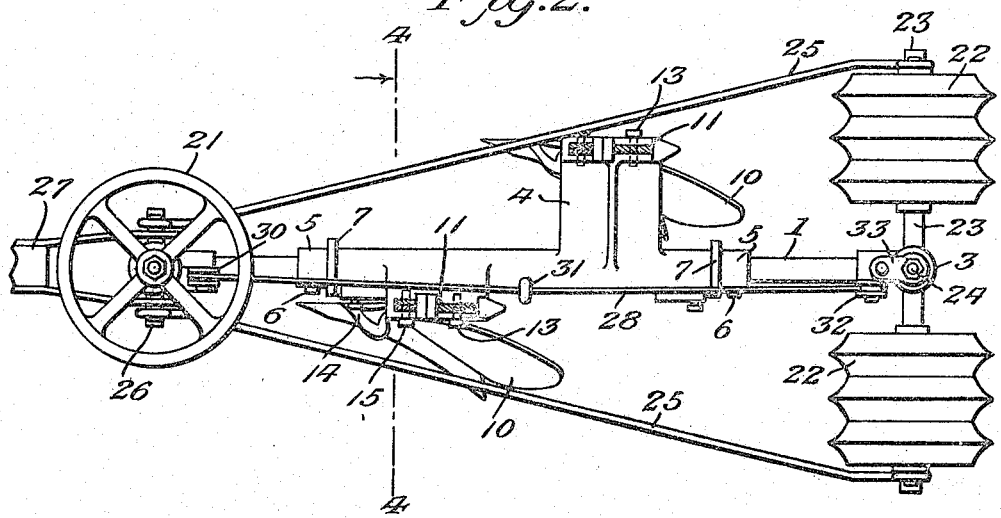
Fig. 2 is a plan view, with parts in section on the line 2—2 of Fig. 1.

The plow consists of the frame 1, preferably of tubing, the unions 2 and 3 at the forward and rear ends secured to the tubing 1, and the casting 4. The casting 4 is sleeved upon the tube 1, and carries the plows and jointers, and it may be held axially in position thereon by any approved means for the purpose. For example, a collar 5 is secured to the tubing 1 at each end of the casting by a screw 6 or equivalent means. These collars have flanges 7, in which are formed the two oppositely located notches 8, and these notches are in position to receive the spring-actuated latches 9 to hold the plows in either of two positions.

The numeral 10 represents the plows, of which four are shown. These are secured on opposite ends of the steel bars 11, and these steel bars extend through the slots 12 in the casing 4, where they are held by bolts 13 extending through the slots as well as through holes in the bars.

Jointers 14 are similarly held by bolts 15, although these are adjustable and provided with holes 16 to receive the bolts. By pushing them in or out through the slots 17, the depth of cut of the jointers is regulated.

Caster-wheel 18 supports the forward end of the frame, and the position of this may be adjusted vertically by the quick acting screw 19 threaded in the union 2, and having the swivel connection 20 at its lower end for connecting it with the caster-wheel. A hand-wheel 21 is provided for turning this screw.

The corrugated rollers or the like 22 are carried by the axle 23, and this is attached to the lower end of the rod 24, which is slidable up and down in the union 3. Brace-rods 25 extend from the ends of the axle to the studs 26 at the forward end of the machine, when the machine is to be pulled by team, and tongue 27 is pivoted to these studs 26.

As a means for simultaneously adjusting the caster-wheel 18 and the corrugated rollers 22, a wire rope or cable 28 is connected at its forward end to the caster frame as at 29, passing over roller 30 under the guide 31 and roller 32 to an arm 33 on the upper end of the rod 24. The function of this will be readily understood. When it is desired to cause the plows to plow deeper, the screw 19 is turned to the left, raising the caster-wheel 18. This slackens the cable 28, and permits the rod 24 to rise and the corrugated rollers 22 to ride upon the surface of the ground. But when the plows are not intended to cut as deep a furrow, the screw 19 is turned to the right, lowering the caster-wheel 18, and by the tension through the cable 28 pulling the rod 24 down, and forcing the corrugated rollers 22 down upon the surface of the soil.

It is perfectly obvious that either one or both sets of plows and jointers may be used, accordingly as the machine is propelled by a team or a tractor. Also it is understood that to reverse the plow, the casting 4 is simply turned over in the opposite position to bring the upper set of plows into play. This reversing may take place at the end of each furrow, when it is desired to plow back and forth, and not around a land.

In this way, a simple and effectual mechanism is provided for the plowing operation.

I claim:

1. A reversible plow including a frame, a sleeve rotatably mounted thereon, and having openings therein, plows, bars secured thereto and extending into the openings, and jointers or colters secured in openings in the sleeve.

2. A reversible plow including a frame, a sleeve rotatably mounted thereon and having projections extending outwardly therefrom, each of said projections having aligned front and rear openings therein, plows, bars secured thereto and extending into the rear openings for connecting the plows to the sleeve, and jointers or colters secured in the front openings of the projections.

3. In a reversible plow, the combination with a frame, of a casting sleeved thereon and capable of having its position reversed, bars secured to the casting and having plows on their opposite ends, collars secured to the frame at either end of the casting, said collars having notched flanges, and spring-actuated latches slidably connected with the opposite ends of the casting adapted to enter notches in the collars for holding the casting in axial position.

In testimony whereof I affix my signature.

JOHN C. MATTICE.